(12) United States Patent
Maki

(10) Patent No.: US 8,498,281 B2
(45) Date of Patent: *Jul. 30, 2013

(54) MOBILE WLAN GATEWAY

(71) Applicant: Huawei Technologies Co., Ltd., Guangdong (CN)

(72) Inventor: Lasse Maki, Espoo (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,602

(22) Filed: Dec. 11, 2012

(65) Prior Publication Data

US 2013/0121197 A1    May 16, 2013

Related U.S. Application Data

(63) Continuation of application No. 13/240,419, filed on Sep. 22, 2011, which is a continuation of application No. 12/264,726, filed on Nov. 4, 2008, now Pat. No. 8,064,417.

(30) Foreign Application Priority Data

Jan. 16, 2008   (FI) ...................................... 20080032

(51) Int. Cl.
H04W 84/02        (2009.01)
H04W 12/06        (2009.01)
H04W 72/04        (2009.01)

(52) U.S. Cl.
USPC ........... 370/338; 370/328; 370/254; 370/401; 370/465; 455/422.1

(58) Field of Classification Search
USPC ................. 370/252, 254, 328, 338, 331–332, 370/392, 401, 465; 455/422.1, 434, 436–438, 455/450
See application file for complete search history.

(56) References Cited

U.S. PATENT DOCUMENTS 7,408,910 B2    8/2008    Kimata et al.
7,441,043 B1   10/2008    Henry et al.
(Continued)

FOREIGN PATENT DOCUMENTS

DE    102005051291 A1    5/2007
EP        1914954 A1    4/2008
(Continued)

OTHER PUBLICATIONS

Second office action issued in corresponding Australian patent application No. 2008347702, dated Nov. 14, 2012, total 3 pages.
(Continued)

Primary Examiner — Candal Elpenord
(74) Attorney, Agent, or Firm — Huawei Technologies Co., Ltd.

(57) ABSTRACT

This disclosure provides a technique for operating a mobile station as a wireless local-area network (WLAN) gateway. The mobile station is provided with a gateway application to control the following operations: activating a WLAN circuitry of the mobile station as a WLAN base station capable of communicating with at least one WLAN terminal over a WLAN network; creating a network identifier for the WLAN base station; assigning an internet protocol address for the at least one WLAN terminal; resolving domain name service (DNS) queries in cooperation with an external DNS service system; assigning at least one port number for each protocol supported by the gateway application; and tunneling internet traffic between the at least one WLAN terminal and an internet host over the broadband connection.

19 Claims, 5 Drawing Sheets

U.S. PATENT DOCUMENTS

| | | | |
|---|---|---|---|
| 7,450,554 B2 * | 11/2008 | Zhang | 370/338 |
| 7,577,142 B2 | 8/2009 | Kloth | |
| 7,650,148 B2 | 1/2010 | Kim et al. | |
| 7,743,094 B2 * | 6/2010 | Metke et al. | 709/203 |
| 7,801,100 B2 | 9/2010 | Agardh et al. | |
| 7,831,236 B2 | 11/2010 | Robertson et al. | |
| 7,849,177 B2 | 12/2010 | Uhlik | |
| 7,916,663 B2 | 3/2011 | Yee | |
| 7,944,867 B2 | 5/2011 | Usuba | |
| 8,032,174 B2 | 10/2011 | Kezys et al. | |
| 8,036,191 B2 | 10/2011 | Kroeselberg et al. | |
| 8,050,192 B2 | 11/2011 | Park | |
| 8,064,402 B2 | 11/2011 | Jun et al. | |
| 8,064,417 B2 | 11/2011 | Maki | |
| 8,064,418 B2 | 11/2011 | Maki | |
| 8,073,446 B2 | 12/2011 | Ishii et al. | |
| 2002/0069278 A1 | 6/2002 | Forsloew | |
| 2003/0035397 A1 | 2/2003 | Haller et al. | |
| 2003/0165128 A1 | 9/2003 | Sisodia et al. | |
| 2004/0077374 A1 | 4/2004 | Terry | |
| 2004/0125762 A1 | 7/2004 | Haller et al. | |
| 2004/0203836 A1 | 10/2004 | Gorday et al. | |
| 2004/0221046 A1 | 11/2004 | Heinonen et al. | |
| 2005/0036468 A1 * | 2/2005 | Miyabayashi et al. | 370/338 |
| 2005/0043035 A1 | 2/2005 | Diesen et al. | |
| 2005/0286476 A1 | 12/2005 | Crosswy et al. | |
| 2006/0068799 A1 | 3/2006 | Morton et al. | |
| 2006/0123470 A1 | 6/2006 | Chen | |
| 2006/0126565 A1 | 6/2006 | Shaheen et al. | |
| 2006/0126584 A1 | 6/2006 | Zhang et al. | |
| 2007/0002833 A1 * | 1/2007 | Bajic | 370/352 |
| 2007/0008937 A1 | 1/2007 | Mody et al. | |
| 2007/0160023 A1 | 7/2007 | Wittmann | |
| 2007/0211714 A1 | 9/2007 | Metke et al. | |
| 2008/0014934 A1 * | 1/2008 | Balasubramanian et al. | 455/434 |
| 2008/0267152 A1 | 10/2008 | Alnas et al. | |
| 2009/0040954 A1 | 2/2009 | Usuba | |
| 2009/0067395 A1 | 3/2009 | Curtis et al. | |
| 2009/0290561 A1 | 11/2009 | Kleindl | |
| 2011/0177805 A1 | 7/2011 | Maki et al. | |
| 2012/0008612 A1 | 1/2012 | Maki | |
| 2012/0010521 A1 | 1/2012 | Maeki | |
| 2012/0257610 A1 | 10/2012 | Maki et al. | |

FOREIGN PATENT DOCUMENTS

| | | | |
|---|---|---|---|
| GB | 2369003 A | 5/2002 | |
| GB | 2407003 A | 4/2005 | |
| JP | 2005189154 A | 7/2005 | |
| KR | 20060019707 A | 3/2006 | |
| KR | 100638439 B1 | 10/2006 | |
| WO | 2004075583 A1 | 9/2004 | |
| WO | 2005011183 A2 | 2/2005 | |
| WO | 2006088135 A1 | 8/2006 | |
| WO | 2006094256 A1 | 9/2006 | |
| WO | 2009090295 A1 | 7/2009 | |
| WO | 2009135986 A1 | 11/2009 | |

OTHER PUBLICATIONS

Search report & Written Opinion issued in corresponding PCT application No. PCT/FI2008/050617, dated Jan. 21, 2009, total 10 pages.

Search report & Written Opinion issued in corresponding PCT application No. PCT/FI2008/050717, dated Apr. 7, 2009, total 10 pages.

Notice of Allowance issued in corresponding U.S. Appl. No. 12/264,726, dated Sep. 1, 2011, total 12 pages.

First Office Action issued in corresponding U.S. Appl. No. 12/264,726, dated Mar. 30, 2011, total 58 pages.

Office Action issued in corresponding U.S. Appl. No. 12/336,279, dated May 25, 2011, total 49 pages.

Office Action issued in corresponding U.S. Appl. No. 12/933,855, dated Jun. 12, 2012, total 30 pages.

First office Action issued in corresponding U.S. Appl. No. 13/240,468, dated Oct. 2, 2012, total 35 pages.

First office Action issued in corresponding U.S. Appl. No. 13/240,419, dated Jan. 8, 2013, total 28 pages.

Search report issued in corresponding European patent application No. 08870831.8, dated Jun. 13, 2012, total 9 pages.

Search report issued in corresponding European patent application No. 09841657.1, dated Jun. 13, 2012, total 10 pages.

Office action issued in corresponding European patent application No. 08870831.8, dated Oct. 15, 2012, total 9 pages.

Notification of Reason for Rejection issued in corresponding Japanese patent application No. 2010542654, dated Nov. 25, 2011, total 9 pages.

Http://www.skytel.co.cr/microsoft/research/acrobat/050810: "MDA Pro User Manual", Aug. 10, 2005, total 205 pages.

Hung-yu Wei et al:"WWAN/WLAN Two-Hop-Relay Architecture for Capacity Enhancement", IEEE Communications Society, Wireless Communications and Networking Conference, WCNC, dated 2004, total 6 pages.

Globesurfer II, Brochure, www.opition.com/products/globesurfer>II.shtml, 2007.

Search report issued in corresponding PCT application No. PCT/FI2009/050770, dated Mar. 9, 2010, total 7 pages.

* cited by examiner

MOBILE WLAN GATEWAY

CROSS REFERENCE TO RELATED APPLICATIONS

This application is a continuation of U.S. patent application Ser. No. 13/240,419, filed on Sep. 22, 2011. The U.S. patent application Ser. No. 13/240,419 is a continuation of U.S. patent application Ser. No. 12/264,726, filed on Nov. 4, 2008, now U.S. Pat. No. 8,064,417. The U.S. Pat. No. 8,064,417 claims priority from Finnish Patent Application No. 20080032, filed on Jan. 16, 2008. The contents of the aforementioned patent applications are hereby incorporated by reference in their entireties.

TECHNICAL FIELD

This application relates to methods, apparatuses and software products for providing a wireless broadband internet connection via a mobile communication network. In the context of the present invention, a broadband connection means a connection capable of transmitting traffic, in good network conditions, faster than a V.90 modem can, or faster than 64 kilobits per second.

BACKGROUND

Wireless broadband modems can be used to couple personal computers or client terminals to the internet in places where wired internet connections or local-area networks are not available. Prior art wireless broadband modems exhibit certain problems. For instance, sharing a single wireless broadband connection among several users (client terminals) is awkward at best. Normally this requires setting up one of several client terminals as a master terminal that provides the internet connection to the remaining client terminals. This process consumes resources of the master terminal and the client terminals cannot operate without the master. The difficulty of sharing a single wireless broadband connection among several users is understandable in view of the fact that most wireless broadband modems are given or sold at a nominal cost by mobile network operators in connection with a network subscription. The network operators' obvious desire is to sell a subscription to each user instead of sharing a single connection among several users.

Another problem of prior art wireless broadband modems is the fact that most of them are "wireless" only towards the mobile network and the connection to the client terminal takes place via a USB cable. The wired connection is actually a benefit in connection with fixed client terminals, such as home computers, because the wired connection can also supply power to the wireless broadband modem, but in connection with mobile client terminals, the wired nature of the USB connection is a definite handicap.

SUMMARY

An object of the present invention is to develop a method, an apparatus and software products so as to alleviate one or more of the problems identified above. The object is achieved by methods, apparatuses and software products as defined in the attached independent claims. The dependent claims and the drawings with their associated descriptions relate to specific embodiments.

An aspect of the invention is a method for operating mobile station as wireless local-area network (WLAN) gateway. The mobile station comprises a memory for storing applications and data; a processor for executing the stored applications; a user interface comprising an input section and an output section; reception/transmission circuitry for providing a communication interface to one or more access networks; authentication means operable to authenticate a user of the mobile station; a radio transceiver operable to establish and maintain a broadband connection with a mobile communication network in response to a successful authentication of the user of the mobile station; and wireless WLAN means responsive to an activation or deactivation command according to a setting received via the input section of the user interface. The inventive method comprises instructing the processor by a gateway application to control the following operations:

activating the WLAN means as a WLAN base station capable of communicating with at least one WLAN terminal over a WLAN network;
  creating a network identifier for the WLAN base station;
  assigning an internet protocol address for the at least one WLAN terminal;
  resolving domain name service (DNS) queries in cooperation with an external DNS service system;
  assigning at least one port number for each protocol supported by the gateway application; and
  tunneling internet traffic between the at least one WLAN terminal and an internet host over the broadband connection.

Another aspect of the invention is gateway application implemented as a software product which comprises a code portion for instructing the mobile station's processor to control the mobile station to perform each of the six above-defined operations. Yet another aspect of the invention is a mobile station which comprises the inventive gateway application, either as a factory-installed application or as a downloadable application.

In one specific embodiment the mobile station further comprises means for receiving, installing and executing downloadable programs and the inventive gateway application is a downloadable application. Implementing the inventive gateway application as a downloadable application provides the added benefit that the inventive technique is applicable to mobile stations which are physically capable of performing the inventive method but do not contain the necessary software.

In another specific embodiment the gateway application further comprises a code portion to redirect a first HTTP page request from each mobile station during an internet session to a predetermined internet address. Redirecting the mobile station's first HTTP page request during an internet session provides the owner of the predetermined internet address with the benefit that the mobile station user must begin an internet session via the predetermined internet address. That address may contain useful information or advertisements, for example.

Yet another specific embodiment is a gateway application for a mobile station, wherein the mobile station comprises a GPS receiver or other means for determining the mobile station's location, and the gateway application comprises a code portion for associating the determined location to the tunnelled internet traffic. The gateway application and/or some internet-based supplementary server(s) may use the determined location to produce one or more additional or supplementary services to the WLAN terminal.

The gateway application may further comprise a code portion for collecting traffic statistics in respect of the tunnelled traffic and for transmitting at least some of the collected traffic statistics to an advertising server and/or billing server, so as to use the traffic statistics for advertising and/or billing.

BRIEF DESCRIPTION OF DRAWINGS

In the following the invention will be described in greater detail by means of specific embodiments with reference to the attached drawings, in which.

DETAILED DESCRIPTION OF EMBODIMENTS

Figure 1:
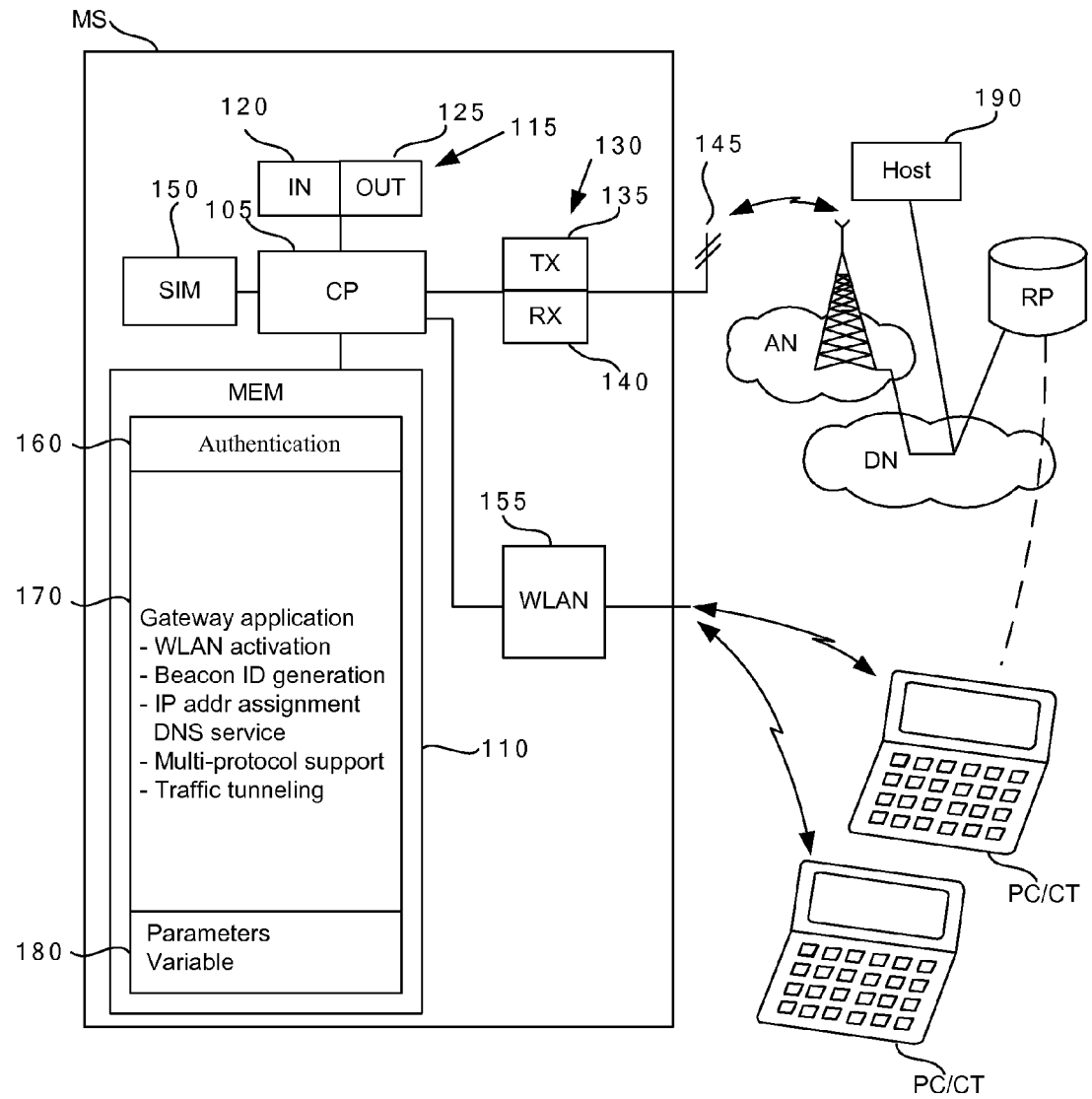
FIG. 1 is a schematic block diagram of a representative mobile station.

FIG. 1 is a schematic block diagram of a representative mobile station MS. The mobile station MS comprises a central processing unit CP 105 and memory MEM 110. In addition, the mobile station MS comprises or utilizes external input-output circuitry 115 which constitutes the multimode terminal's user interface and comprises an input circuitry 120 and an output circuitry 125. The input circuitry 120 comprises the mobile station's microphone and user-input device, such as a keypad and/or touch screen. The output circuitry 125 comprises the mobile station's display and earphone or loudspeaker. The mobile station MS further comprises reception/transmission circuitry 130 which comprises a transmission circuitry 135, reception circuitry 140 and antenna 145. A subscriber identity module (SIM) 150 is used by an authentication function 160 to authenticate the mobile station user and to identify the user's subscription to the access network. The mobile station also comprises WLAN (Wireless Local Area Network) circuitry 155 whose normal mode of usage is acting as a WLAN client to a WLAN base station (not shown).

In order to support installable program modules, the mobile station's memory MEM 110 may comprise routines for downloading installable program modules and for storing the installable program modules in the memory MEM 110 for execution by the central processing unit CP 105. FIG. 1 shows an arrangement in which the mobile station is configured to download installable program modules from a repository RP via a data network DN, an access network AN, the antenna 145 and reception circuitry 140, although other arrangements are equally possible, such as downloading the installable program modules via the data network DN to a personal computer PC, from which the installable program modules are transferred to the mobile station the WLAN circuitry 155 or via some other short-range connection, such as Bluetooth or Universal Serial Bus (USB, not shown separately). The reference sign PC/CT means that the personal computer (PC) serves as an example of a client terminal (CT). The access network AN is typically a broadband-capable mobile communication network, while the data network DN is typically the internet or some closed subnetwork implementing internet protocol (IP), commonly called intranets or extranets. At this level of generalization, all previously-discussed elements of FIG. 1 can be conventional as used in the relevant art. One or more external hosts 190 are accessible via the access network AN and data network DN, as will be described in more detail below. Finally, reference numeral 180 denotes an area of the memory 110 used to store parameters and variables.

The foregoing description of FIG. 1 describes an applicable mobile station in technical terms. Such mobile stations are commercially available: For instance, at the priority date of the present invention, mobile stations based on Symbian S60 or S80 platforms can be used, provided that they support WLAN and broadband communications. A departure from prior art mobile stations can be seen in the fact that the mobile station comprises the inventive gateway application 170, either as a factory-installed software application or as a downloadable application. The reference sign PC, which denotes the personal computer being used as the client terminal, is derived from "personal computer", but those skilled in the art will realize that the mobile station MS provided with the inventive gateway application 170 supports virtually any client terminal capable of acting as a WLAN client, such as laptop computers, smart telephones, personal digital assistants, home entertainment devices, digital cameras, etc., to name just a representative sample of applicable device types.

Figure 2:
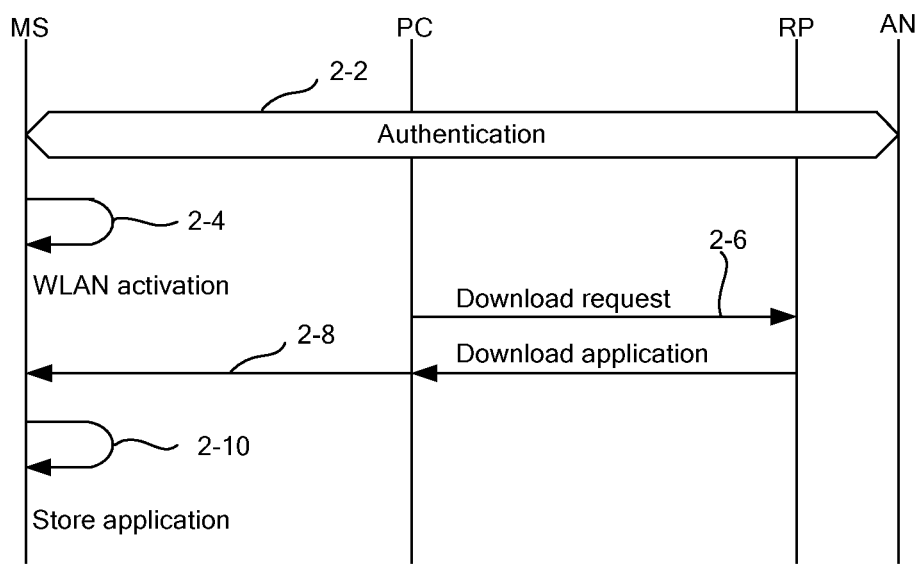
FIG. 2 shows some preparatory acts, some of which may be optional.

FIG. 2 shows some preparatory acts, some of which may not be necessary in all embodiments of the present invention. In step 2-2, the mobile station MS is authenticated. This step, which is well known to those skilled in the art, involves reception of a PIN code via the mobile station's user interface, and using the mobile station's SIM card in a registration process to the access network AN. In step 2-4, the mobile station's WLAN circuitry is activated according to a setting from the mobile station's user interface. In steps 2-6 through 2-8, the inventive gateway application is downloaded via a personal computer PC from the repository RP. In cases where the gateway application is downloaded without the personal computer, the download request and application download would take place directly between the mobile station MS and the repository RP. In step 2-10, the downloaded gateway application is stored in the mobile station's memory for later execution, as will be further described in connection with FIG. 3.

The WLAN activation step may not be necessary if the mobile station's WLAN circuitry is permanently enabled. The downloading and storing acts may be omitted in embodiments having the gateway application permanently stored or pre-installed in the mobile station's memory.

Figure 3:
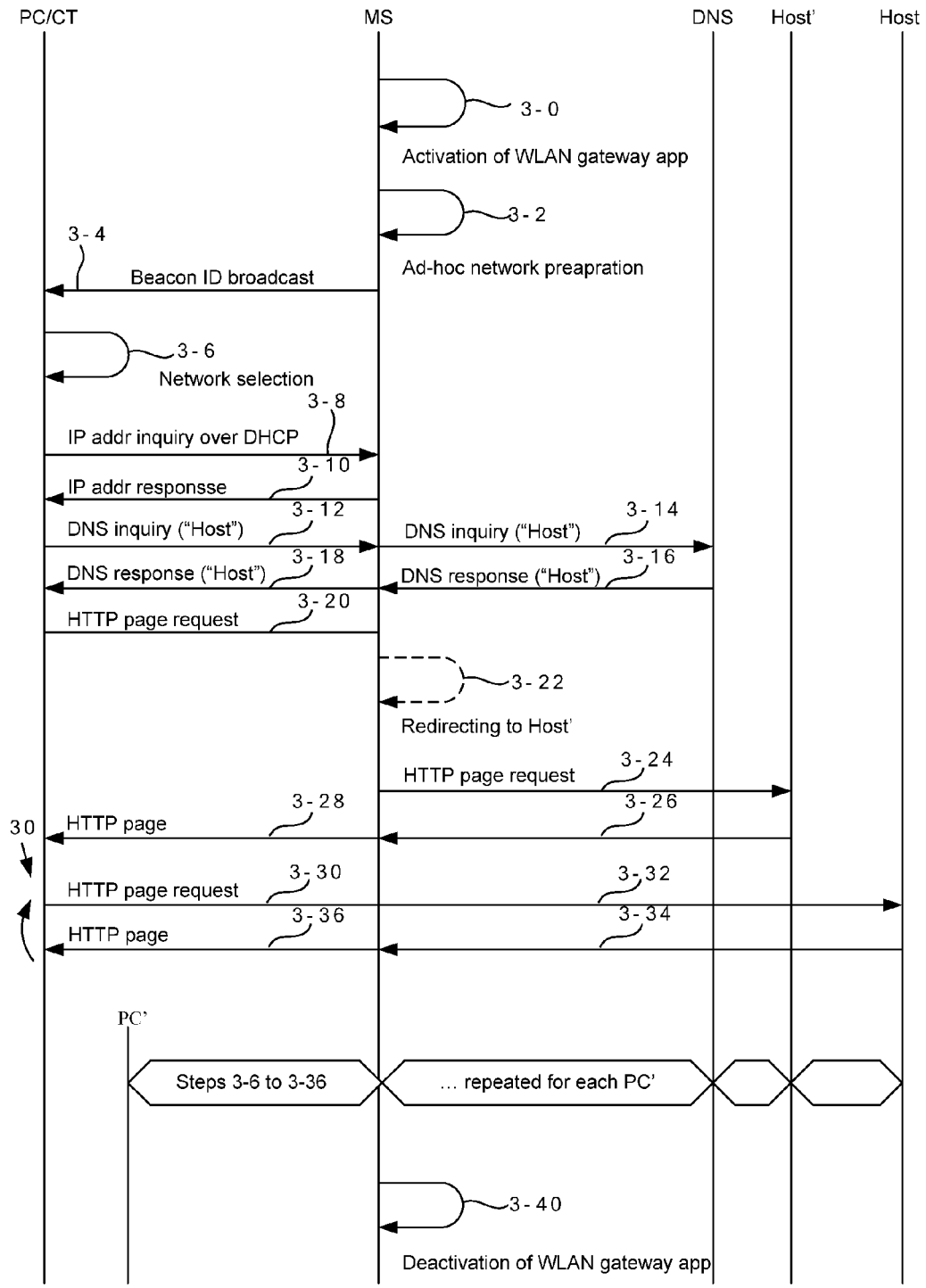
FIG. 3 shows an illustrative scenario involving a client terminal and a mobile station which supports a gateway application according to the present invention.

FIG. 3 depicts an illustrative scenario involving a client terminal (represented in FIG. 3 by a personal computer PC) and a mobile station which supports a gateway application according to the present invention. In step 3-0, the inventive gateway application is executed in the mobile station. The execution of the gateway application is typically started in response to a user instruction via the mobile station's user interface. In a typical implementation, the mobile station receives user interface navigation instructions to "Applications" from which the inventive gateway application is selected for execution. One of the acts performed by the mobile station's processor, under control of the inventive gateway application, is to ensure that the WLAN circuitry of the mobile station is operational. The significance of step 3-0, and of the corresponding deactivation step 3-40, is that the mobile station is only reserved for wireless broadband gateway applications for a user-specified time, and at other times the mobile station can perform whatever tasks required by its user.

In step 3-2, the gateway application instructs the mobile station's processor to prepare an ad-hoc WLAN network around the mobile station, by acting as a WLAN base station (as opposed to the mobile station's more conventional usage as a WLAN client). In step 3-4, the gateway application instructs the mobile station to initiate broadcasting of a beacon ID message, which typically is an IBSSID message as defined in standard IEEE 802.11x. Step 3-4 is depicted as an arrow, but in practice the broadcasting of the beacon ID message should be repeated until step 3-40 in which the execution of the gateway application is terminated.

In step 3-6, the client terminal PC searches for available WLAN networks and detects the broadcasted beacon ID and selects the WLAN network created by the mobile station MS. In step 3-8, the client terminal PC, as part of a conventional WLAN attach procedure, requests an IP address from the mobile station's WLAN base station, which returns the requested IP address in step 3-10. Dynamic Host Configuration Protocol (DHCP) is typically used for steps 3-8 and 3-10.

Let us assume that the client terminal PC tries to retrieve a web page from the internet host (item 190 in FIG. 1). In step 3-12, the client terminal PC sends a domain name service (DNS) query for the IP address of the host's web page to the DNS server of the mobile station's gateway application. In step 3-14, the mobile station's gateway application forwards the DNS query to internet's domain name service and obtains the host's IP address in step 3-16. In step 3-18 the mobile station's gateway application returns the host's IP address to the client terminal PC.

In step 3-20, the client terminal PC requests a web page from the host's IP address. Hypertext Transfer Protocol (HTTP) is typically used for this purpose. This request, like any communication between the client terminal PC and any internet hosts, takes place via the inventive gateway application being executed in the mobile station. Step 3-22 is an optional step which may be omitted in some embodiments. When performed, step 3-22 comprises redirecting the first HTTP page request from client terminal PC to another internet host, called Host'. This means that in step 3-24 the gateway application forces the client terminal's first HTTP page request to a forced home page at the IP address of Host'. For example, the operator of the site Host' may display advertisements in exchange of sponsoring communication costs over the access network AN. In step 3-26, the web site Host' returns the requested web page, which the gateway application relays to the client terminal PC in step 3-28.

In step 3-30, the client terminal PC again requests the web page from the host's IP address. Since this the second (or further) page request from the client terminal, the gateway application no longer redirects the HTTP request but relays it to the Host in step 3-32. In steps 3-34 and 3-36, the requested web page from the Host is transmitted to the client terminal. As shown by arrow 30, the process can return from step 3-36 to step 3-20 when future web pages are requested. The loops 3-30 through 3-36 can be repeated until the gateway application is terminated in step 3-40. If the forced home page feature (step 3-22) is not implemented, the first HTTP request (step 3-20) is processed similarly to the subsequent HTTP requests (step 3-30). In subsequent executions of step 3-30, if the HTTP page request relates to a web page for which the gateway application does not have an IP address, a DSN query will be performed (cf. steps 3-14 and 3-16).

FIG. 3 also shows an additional client terminal, denoted PC'. Steps 3-6 through 3-36 will be repeated for each additional client terminal. This means that by virtue of the inventive gateway application, which instructs the mobile station MS to act as a WLAN base station (as opposed to a WLAN client), the mobile station MS can support an arbitrary number of client terminals which act as WLAN client terminals and which, by virtue of the authentication performed by the mobile station, can share a single subscription to the access network.

FIG. 3 and the foregoing description of it illustrate use of HTTP protocol. The inventive gateway application supports other protocols in an analogous manner and assigns a specific port number to each supported protocol. For instance, the gateway application can instruct the mobile station to convey encrypted HTTPS traffic by utilizing the Proxy Configuration field of HTTPS protocol.

In addition to merely conveying internet traffic between the client terminal PC and the internet host, the inventive gateway application can, in some specific embodiments, provide additional or supplementary services which utilize some of the functionality of modern mobile stations. In some implementations, such supplementary services are provided by an arrangement in which a supplementary server enhances the service(s) provided by a primary server. Such a supplementary server can be part of the functionality of the inventive WLAN gateway application, or it can be implemented as a network element distinct from the primary server.

One exemplary implementation of such additional services involves utilization of GPS (Global Positioning System) devices incorporated into some mobile stations. The inventive gateway application may be enhanced to associate GPS-provided geographical coordinates to the PC-to-host traffic, or some of that traffic. For instance, the gateway application can tag still or video image data with geographical coordinates and/or use some additional service (not shown separately) that maps the geographical coordinates to a plaintext name of the relevant location. In another implementation the gateway application associates GPS-provided coordinates to the traffic, or some of it, while the actual tagging of the images with the coordinates is provided by some additional server, such as an image sharing server (not shown separately). Actually, what matters is the location of the client terminal and not the location of the mobile station acting as a WLAN gateway. But considering the short range of the mobile station's WLAN transmission, the mobile station's location can be used as the client terminal's location for virtually all practical purposes.

In a more ambitious implementation, the gateway application can provide additional services on the basis of the geographical coordinates. For instance, the gateway application can recognize various queries initiated by the client terminal and/or responses to those queries by internet servers and enhance the query responses by relevant map or photography information. For instance, the gateway application can detect a query to "post" and provide the query response with a map and/or photograph of the post office closest to the mobile station's GPS-provided geographical coordinates. In order to obtain the map and/or photograph, the gateway application may query a supplementary server which provides the requested functionality.

Another example of such additional services relates to traffic statistics which the gateway application collects and transmits to some internet-based supplementary server (not shown separately). For example, such a supplementary server may use the traffic statistics to monitor Quality of Service (QoS) parameters, which can be used to maintain the QoS at a specified level and/or to optimize resource usage in the access network. In some embodiments the supplementary server is an advertising server. The advertising server may utilize the traffic statistics for targeted or tailored advertising to the client terminal PC. Such traffic statistics may include, for example, user identification, usage (amount of traffic, usage times, internet addresses visited, query parameters, or the like). Alternatively or additionally, the gateway application can transmit traffic statistics to a billing server which participates in charging the client terminal's subscriber. Yet further, the advertising server and the billing server may cooperate in such a manner that the advertising server's operator sells advertisement space or time and the advertising server credits the client terminal's subscriber for any advertisements received. The credits are then relayed to and used by the billing server in order to reduce the client terminal's subscriber's invoice, generate additional services, extend prepaid subscription time, to name just a few examples.

Finally, the gateway application may be configured to convey the mobile station's location, or some derivative it, to the advertising server for targeted or tailored advertising on the basis of the mobile station's location. For instance, targeted advertising for some goods or service may include sending an advertisement to a client terminal only if the mobile station's location indicates that the client terminal is reasonably close to the outlet of the goods or service. On the other hand, tailored advertising may be implemented such that the advertisement indicates the address or location of the closest outlet.

Figure 4:
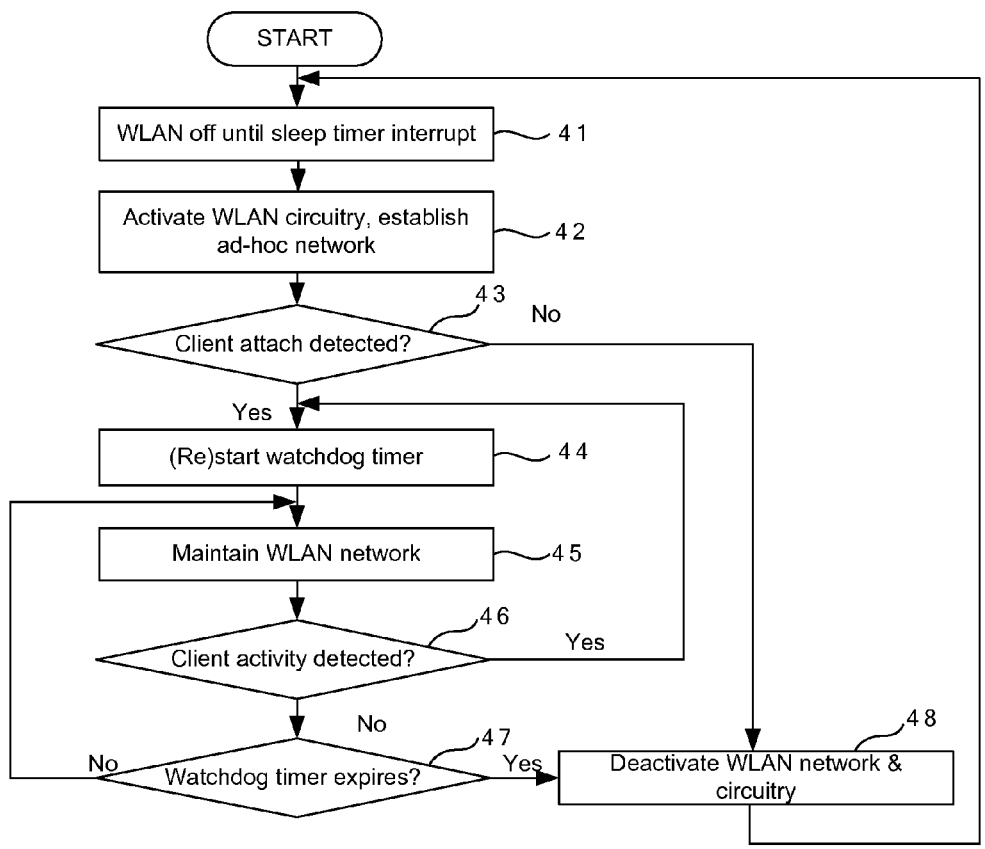
FIG. 4 shows an embodiment in which the gateway application in the mobile station is activated automatically in response to detection of a nearby WLAN client terminal.
Figure 5:
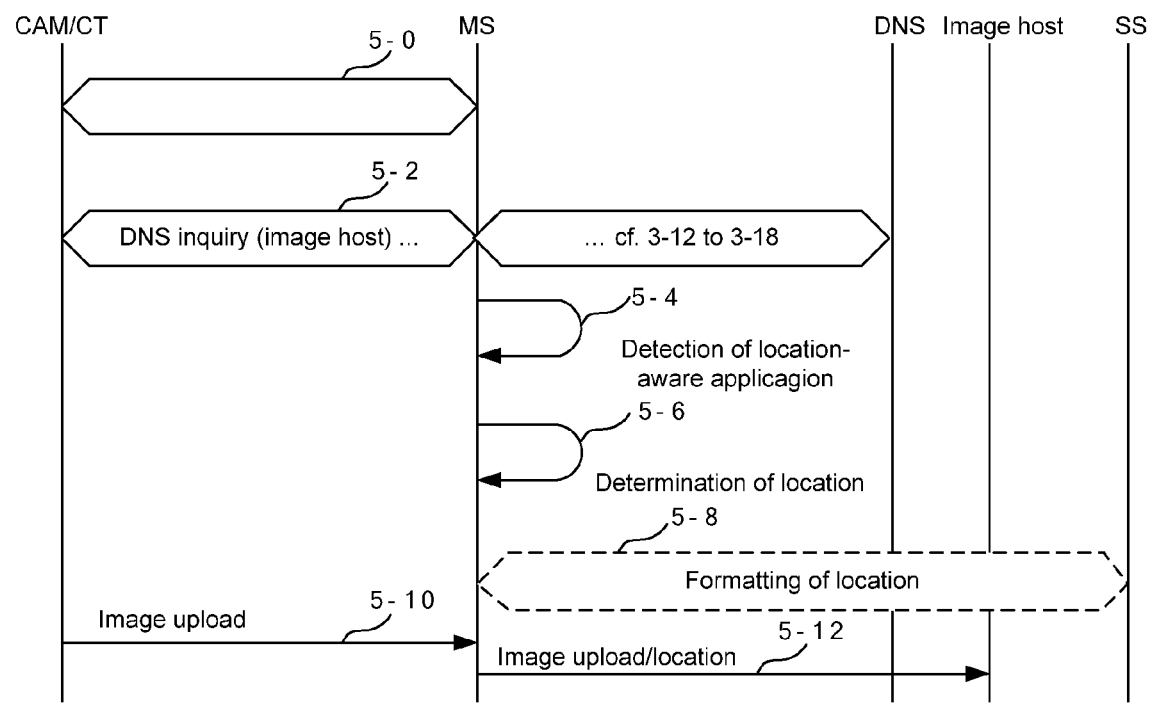
FIG. 5 shows an embodiment in which the mobile station's location-determination functionality is used to enhance image uploading to an image hosting server.

FIGS. 4 and 5 illustrate some exemplary embodiments in which the present invention benefits from the functionality of modern mobile stations, such that the resulting WLAN gateway is functionally superior to dedicated WLAN base stations. FIG. 4 shows an embodiment in which the WLAN circuitry, and optionally the WLAN gateway application, in the mobile station MS is activated periodically to detect possible WLAN client terminals CT nearby. In one representative scenario, a WLAN-capable digital camera acts as a WLAN client terminal. In the embodiment shown in FIG. 4, the mobile station MS employs two timers which may be realized by means of software-implemented tick counters, as is well known to those skilled in the art. One of the timers is called a sleep timer while the other is called a watchdog timer. The sleep timer's function is to periodically wake up the mobile station's WLAN circuitry, and optionally the WLAN gateway application. The watchdog timer is used to detect non-activity periods of predetermined length in the WLAN network so that the WLAN circuitry can be powered off in order to optimise battery resources.

In step 41, the WLAN circuitry of the mobile station MS is powered off and the execution of the WLAN gateway application may be suspended or terminated. Step 41 terminates when the sleep timer expires. For instance, the sleep timer may generate a processor interrupt which directs the mobile station's processor to perform program routines for activating the WLAN circuitry and starting or resuming execution of the WLAN gateway application. After step 42, the mobile station has established a WLAN network. In step 43, the mobile station checks if any client terminal(s), such as the exemplary digital camera, attempt(s) to attach to the WLAN network. If not, the process proceeds to step 48, in which the WLAN network and circuitry are deactivated and the process begins anew at step 41. On the other hand, if any client terminal attaches to the WLAN network, the mobile station starts a watchdog timer in step 44 and maintains the WLAN network as indicated in step 45. Step 46 includes a test to detect client terminal activity. If client terminal activity is detected, the process returns to step 44 in which the watchdog timer is restarted. Naturally, any client-related requests are served as well, as part of the basic functionality of the WLAN gateway application. On the other hand, if no client terminal activity is detected, the process proceeds to step 47 which is a test as to whether the watchdog timer has expired. If not, the process returns to step 45 in which the WLAN network is maintained without restarting the watchdog timer. Eventually, a moment occurs when no client activity has been detected and the watchdog timer expires, and this is detected in step 47. Then, in step 48, the WLAN network and circuitry are deactivated and the process begins anew at step 41.

By virtue of the embodiment described in connection with FIG. 4, the WLAN gateway application may terminate its own execution and power off the mobile station's WLAN circuitry. The automatic execution of the gateway application and the accompanying automatic activation of the mobile station's WLAN circuitry provide certain benefits. For instance, both digital cameras and mobile stations are handicapped by small user interfaces and relatively short battery life, particularly when their liquid-crystal displays (LCD) are illuminated. The automation described in connection with the present embodiment alleviates such handicaps.

FIG. 5 shows an embodiment in which the mobile station's location-determination functionality is used to enhance image uploading to an image hosting server. In step 5-0, a WLAN connection is established between the gateway application being executed in the mobile station MS and the WLAN-equipped digital camera CAM acting as a client terminal CT. For details of the WLAN connection establishment a reference is made to FIGS. 3 and 4. In step 5-2, the camera CAM/CT initiates a DNS inquiry to obtain the internet address of the image hosting server. In step 5-4, an embodiment of the gateway application being executed in the mobile station MS detects that the camera/client terminal CAM/CT executes a location-aware application. Accordingly, the gateway application uses the mobile station's location-determination functionality to determine the mobile station's location. For instance, the mobile station's location may be determined on the basis of the mobile station's built-in satellite-positioning device (GPS) or on the basis of cell ID determination in the access networks. In an optional step 5-8, the gateway application sends the mobile station's location to an embodiment of the supplementary server SS, which in this scenario receives the mobile station's location and returns a plaintext-formatted location description. For instance, the geographical coordinates or cell ID of Piccadilly Circus might be converted to a plaintext description of "Piccadilly Circus, London". In step 5-10, the camera/client terminal CAM/CT begins uploading of image data to the image hosting server. In step 5-12, the gateway application complements the image data with the mobile station's location. In one particular implementation, the location data is placed in a metadata field of the image(s).

It is readily apparent to a person skilled in the art that, as the technology advances, the inventive concept can be implemented in various ways. The invention and its embodiments are not limited to the examples described above but may vary within the scope of the claims.

The invention claimed is:
1. A mobile station, comprising:
a memory configured to store applications and data;
a processor configured to execute the stored applications;
a user interface comprising an input section and an output section;
authentication means operable to authenticate a user of the mobile station;
a radio transceiver providing a communication interface to one or more access networks (AN), configured to establish and maintain a broadband connection with a mobile communication network in response to a successful authentication of the user of the mobile station;
a wireless local-area network (WLAN) circuitry responsive to an activation or deactivation command from the processor or according to a setting received via the input section of the user interface;
wherein the stored applications include a gateway application which comprises:
a first code portion, when executed by the processor, instructs the processor to activate the WLAN circuitry as a WLAN base station capable of communicating with at least one WLAN terminal over a WLAN network;
a second code portion, when executed by the processor, instructs the processor to create a network identifier for the WLAN base station;
a third code portion, when executed by the processor, instructs the processor to assign an internet protocol address for the at least one WLAN terminal;
a fourth code portion, when executed by the processor, instructs the processor to resolve domain name service (DNS) queries in cooperation with an external DNS service system;
a fifth code portion, when executed by the processor, instructs the processor to assign at least one port number for each protocol supported by the gateway application;
a sixth code portion, when executed by the processor, instructs the processor to tunnel internet traffic between the at least one WLAN terminal and an internet host over the broadband connection; and
a seventh code portion, when executed by the processor, instructs the processor to deactivate the WLAN circuitry in response to a detected absence of activity of the at least one WLAN terminal over a predetermined period of time.

2. The mobile station according to claim 1, wherein the processor is configured to execute the first to seventh code portions periodically or in response to a detected activity of the at least one WLAN terminal.

3. The mobile station according to claim 1, further comprising means for receiving, installing and executing one or more downloadable programs and wherein the gateway application is a downloadable application.

4. The mobile station according to claim 1, wherein the gateway application further comprises a code portion, when executed by the processor, redirects a hypertext transfer protocol (HTTP) page request from the at least one WLAN terminal during an internet session to a predetermined internet address.

5. The mobile station according to claim 1, wherein the mobile station further comprises means for determining a location of the mobile station, and the gateway application further comprises a code portion, when executed by the processor, associates the determined location of the mobile station to the tunnelled internet traffic.

6. The mobile station according to claim 5, wherein the gateway application further comprises a code portion, when executed by the processor, provides one or more additional services to the at least one WLAN terminal based on the determined location of the mobile station.

7. The mobile station according to claim 1, wherein the gateway application further comprises a code portion, when executed by the processor, collects traffic statistics in respect of the tunnelled traffic and transmits at least a portion of the collected traffic statistics to a supplementary server.

8. A method for operating a mobile station, wherein the mobile station comprises a memory for storing applications and data; a processor for executing the stored applications; a user interface comprising an input section and an output section; authentication means operable to authenticate a user of the mobile station; a radio transceiver providing a communication interface to one or more access networks, operable to establish and maintain a broadband connection with a mobile communication network in response to a successful authentication of the user of the mobile station; and a wireless local-area network (WLAN) circuitry responsive to an activation or deactivation command from the processor or according to a setting received via the input section of the user interface;
wherein the method comprises the steps of:
activating the WLAN circuitry as a WLAN base station capable of communicating with at least one WLAN terminal over a WLAN network;
creating a network identifier for the WLAN base station;
assigning an internet protocol address for the at least one WLAN terminal;
resolving domain name service (DNS) queries in cooperation with an external DNS service system;
assigning at least one port number for each protocol supported by a gateway application program that enables the WLAN base station;
tunneling internet traffic between the at least one WLAN terminal and an internet host over the broadband connection; and
deactivating the WLAN circuitry in response to a detected absence of activity of the at least one WLAN terminal over a predetermined period of time.

9. The method according to claim 8, wherein the steps of the method are performed periodically or in response to a detected activity of the at least one WLAN terminal.

10. The method according to claim 8, further comprising:
redirecting a hypertext transfer protocol (HTTP) page request from the at least one WLAN terminal during an internet session to a predetermined internet address.

11. The method according to claim 8, wherein the mobile station is capable of determining a location of the mobile station, and the method further comprising:
associating the location of the mobile station to the tunnelled internet traffic.

12. The method according to claim 11, further comprising:
providing one or more additional services to the at least one WLAN terminal based on the determined location of the mobile station.

13. The method according to claim 8, further comprising:
collecting traffic statistics in respect of the tunnelled traffic; and
transmitting at least a portion of the collected traffic statistics to a supplementary server.

14. A computer program product comprising a computer readable non-transitory storage medium storing application programs thereon for use by a mobile station, wherein the mobile station comprises a processor for executing the stored application programs; a user interface comprising an input section and an output section; authentication means operable to authenticate a user of the mobile station; a radio transceiver for providing a communication interface to one or more access networks (AN), operable to establish and maintain a broadband connection with a mobile communication network in response to a successful authentication of the user of the mobile station; and a wireless local-area network (WLAN) circuitry responsive to an activation or deactivation command according to a setting received via the input section of the user interface; wherein the application programs include a gateway application which comprises: a first code portion for instructing the processor to activate the WLAN means circuitry as a WLAN base station capable of communicating with at least one WLAN terminal over a WLAN network; a second code portion for instructing the processor to create a network identifier for the WLAN base station; a third code portion for instructing the processor to assign an internet protocol address for the at least one WLAN terminal; a fourth code portion for instructing the processor to resolve domain name service (DNS) queries in cooperation with an external DNS service system; a fifth code portion for instructing the processor to assign at least one port number for each protocol supported by the gateway application; a sixth code portion for instructing the processor to tunnel internet traffic between the at least one WLAN terminal and an internet host over the broadband connection; and a seventh code portion for instructing the processor to deactivate the WLAN circuitry in response to a detected absence of activity of the at least one WLAN terminal over a predetermined period of time.

15. The computer program product according to claim 14, wherein the gateway application is executed by the processor of the mobile station periodically or in response to a detected activity of the at least one WLAN terminal.

16. The computer program product according to claim 14, wherein the gateway application further comprises a code portion, when executed by the processor, redirects a hypertext transfer protocol (HTTP) page request from the at least one WLAN terminal during an internet session to a predetermined internet address.

17. The computer program product according to claim 14, wherein the mobile station further comprises means for determining a location of the mobile station, and the gateway application further comprises a code portion, when executed by the processor, associates the determined location of the mobile station to the tunnelled internet traffic.

18. The computer program product according to claim 17, wherein the gateway application further comprises a code portion, when executed by the processor, provides one or more additional services to the at least one WLAN terminal based on the determined location of the mobile station.

19. The computer program product according to claim 14, wherein the gateway application further comprises a code portion, when executed by the processor, collects traffic statistics in respect of the tunnelled traffic and transmits at least a portion of the collected traffic statistics to a supplementary server.

* * * * *